July 30, 1929.  G. O. MATTER  1,722,531
TRACTOR
Original Filed Oct. 18, 1926
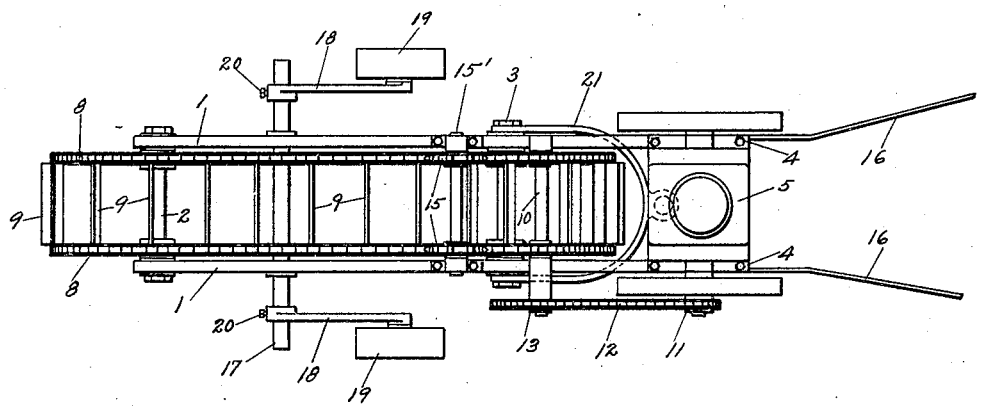
Fig. I
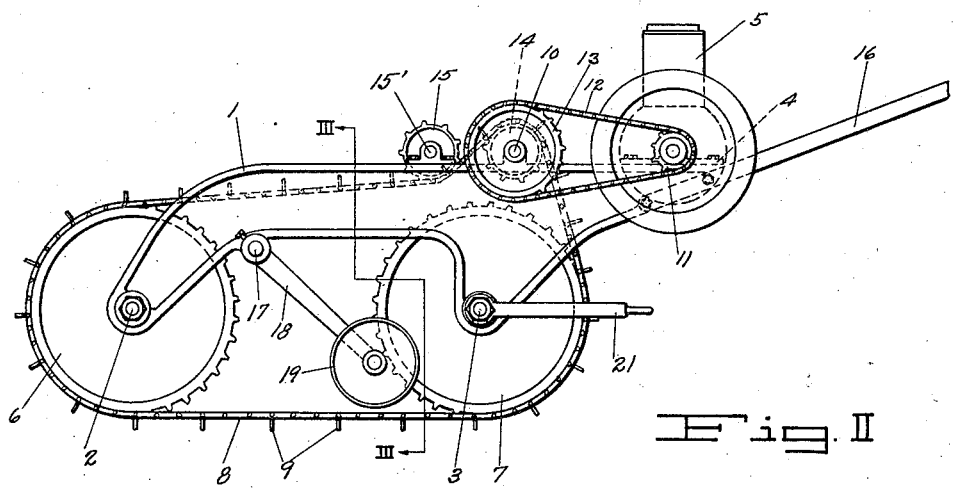
Fig. II
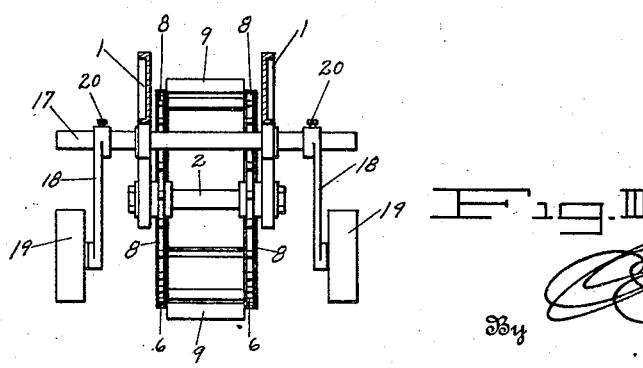
Fig. III
G. O. Matter.
Inventor
By Goldberg
Attorney Patented July 30, 1929.

1,722,531

UNITED STATES PATENT OFFICE.

GUSTAVE O. MATTER, OF PORTLAND, OREGON.

TRACTOR.

Application filed October 18, 1926, Serial No. 142,242. Renewed December 22, 1928.

My invention relates to tractors in which the tractive power is exerted on a single narrow strip of ground at the longitudinal center line of the machine.

The objects of my invention are to produce a small tractor which is simple in construction, inexpensive to manufacture; which can be readily balanced and steered by hand; which is powerful enough to draw a ten-inch plow or its equivalent; which is narrow enough to travel in the furrow made by such a plow, and therefore also narrow enough to permit its use for the purpose of cultivation between the standard rows of grains or vegetables; and in general, which is eminently adapted for the cultivation of smaller tracts of land.

Other objects and advantages are to found in the construction and arrangement of parts as will be described in the specification, and particularly pointed out in the appended claim.

I attain these objects with the mechanism illustrated in the accompanying drawing, in which—

Fig. I is a plan view of the entire tractor.
Fig. II is a side view of Fig. I.
Fig. III is a section through Fig. II along the lines III—III.

Similar numerals refer to similar parts throughout the several views.

The two integrally formed side frames 1, having the outlines shown in the drawing, are rigidly connected with each other by means of the front shaft 2, the rear shaft 3 and the bed plate 4 of the engine 5. Rotatably mounted on the front and rear shaft, between the side frames 1 are the traction wheels 6 and 7 which support the two endless traction chains 8. The cleats 9 between the two traction chains 8 furnish the necessary tractive friction and also distribute the weight of the machine over the entire area of ground as defined by the ground contacts of the four traction wheels.

The motive power for the tractor is furnished by a suitable engine 5 whose revolutions are transferred to a rotary shaft 10 on top of the side frames 1 over the rear traction wheels 7. The sprocket wheel on the engine 5 is designated by the numeral 11, the driving chain by 12, and the sprocket wheel on the rotary driving shaft by 13. A direct drive from the engine 5 to one or both of the rear traction wheels 7 could be employed, but since that would bring the sprocket wheel 13 too close to the ground, the above mentioned indirect drive on top of the side frames 1 is preferred. Keyed on the rotary shaft 10 are the sprocket wheels 14 which transmit the traction chains 8 from the rear traction wheels 7 to the front traction wheels 6. The idlers 15 are mounted on a shaft 15' on top of the side frames 1 and close enough to the sprocket wheels 14 to increase the arc of contact between traction chain 8 and sprocket wheel 14 as much as practicable. The engine 5 is placed on the rearwardly extending ends of the side frames 1 in order to counterbalance the weight of the front part of the tractor, whereby the operator, when desirous of making a short turn, can press down on the handles 16 and then, by balancing the tractor on the rear wheels 7, point the front part quickly in any direction he wishes.

To relieve the operator of further unnecessary exertion and to hold the tractor mechanically in lateral equilibrium, there is a shaft 17 rigidly attached to the lower edges of the side frames 1, preferably to the rear of the front traction wheels 6. Depending from each of the projecting ends of this shaft 17 is an arm 18 with a freely revolving wheel 19 at the lower end. This arm 18 can be swingingly adjusted to the level of the ground. That is, if the tractor travels in a furrow, the wheel 19 would of necessity have to occupy a higher level than when the tractor is used for cultivating purposes. In the latter case also, the arm 18 is shifted on the shaft 17 so that the wheel 19 will travel between the rows of plants. Once the adjustment is made, the arm 18 is firmly held on the shaft 17 by means of the set screw 20. By swinging the arm 18 into a vertical position the tractor is lifted clear of the ground and can then be easily rolled along smooth pavement. The draw bar is designated by the numeral 21.

Having thus described my invention, it will be seen that my objects have been accomplished, and, though I have shown the preferred form of construction, I reserve to myself the right to make minor changes, providing I do not violate the spirit and principle of my invention.

I claim:

In a tractor, the combination of two vertical side frames, rigidly connected by a front and rear axle and extending rearwardly of the rear axle, traction wheels of equal diameter mounted on the front and rear axles, a shaft rotatably mounted on top of the frame, a sprocket wheel rigidly affixed to the shaft and in alinement with the front and rear traction wheels, and a traction chain proceeding from the bottom of the front traction wheel straight toward the bottom of the rear traction wheel, thence over the sprocket wheel on top of the frame toward the top of the front traction wheel, an idler pressing against the top of the traction chain between the sprocket wheel and the front traction wheel, a bedplate across the side frames on the rearward extension of the frames, an engine on the bed plate, and driving means between the engine and the sprocket wheel on top of the frame.

In testimony whereof I affix my signature.

GUSTAVE O. MATTER.